United States Patent [19]
Kobayashi

[11] Patent Number: 5,800,896
[45] Date of Patent: Sep. 1, 1998

[54] DEVICE AND METHOD FOR FILLING A CAVITY IN A STRUCTURAL MEMBER

[75] Inventor: Yasuhiko Kobayashi, Toyota, Japan

[73] Assignee: Neo-Ex Lab. Inc., Toyota, Japan

[21] Appl. No.: 716,532

[22] Filed: Sep. 19, 1996

[30] Foreign Application Priority Data

Sep. 21, 1995 [JP] Japan ................... 7-243088

[51] Int. Cl.⁶ .................... B32B 3/06; B29C 67/00
[52] U.S. Cl. .................... 428/67; 264/45.3; 264/46.4; 264/48; 264/259; 264/271.1; 264/275; 264/DIG. 58; 428/99; 428/206; 428/317.9; 428/329
[58] Field of Search .................... 428/67, 99, 206, 428/306.6, 317.9, 328, 329; 264/45.3, 46.4, 48, 259, 271.1, 275, DIG. 58

[56] References Cited

U.S. PATENT DOCUMENTS

| | | | |
|---|---|---|---|
| 3,902,940 | 9/1975 | Heller, Jr. et al. | 156/79 |
| 4,784,890 | 11/1988 | Black | 428/100 |
| 5,043,114 | 8/1991 | Saito et al. | 264/46.6 |
| 5,226,185 | 7/1993 | Guay et al. | 5/448 |
| 5,273,597 | 12/1993 | Kumagai et al. | 156/79 |
| 5,460,305 | 10/1995 | Ahearn | 224/562 |

FOREIGN PATENT DOCUMENTS

| | | | |
|---|---|---|---|
| 62-152945 | 7/1987 | Japan | B60R 13/02 |
| 2-276836 | 11/1990 | Japan. | |

*Primary Examiner*—James J. Bell
*Assistant Examiner*—Blaine R. Copenheaver
*Attorney, Agent, or Firm*—Dennison, Meserole, Pollack & Scheiner

[57] ABSTRACT

A blocking device for filling a cavity in a hollow structural member includes a foamable material, and magnetic member embedded on a surface of the foamable material, the magnetic member is secured within the hollow structural member and the foamable material is foamed and expanded by the application of heat so that the cavity is filled.

8 Claims, 4 Drawing Sheets

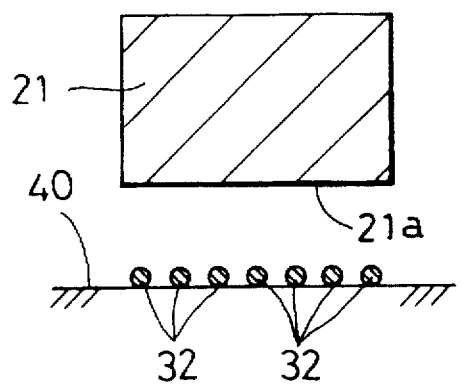
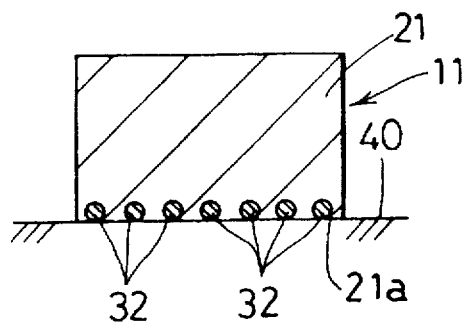
FIG. 4  FIG. 5
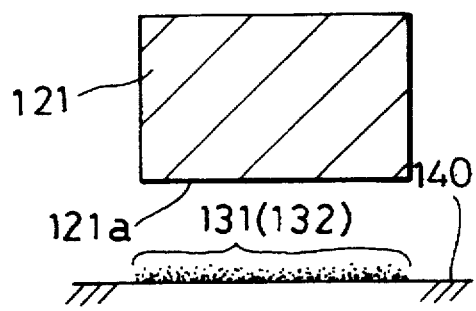
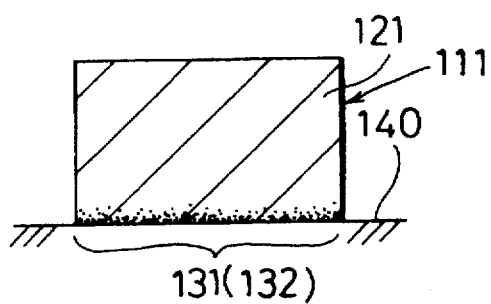
FIG. 6  FIG. 7

DEVICE AND METHOD FOR FILLING A CAVITY IN A STRUCTURAL MEMBER

BACKGROUND OF THE INVENTION

1. Field of the Invention

The present invention relates to a blocking member including a foamable material for blocking a cavity of a hollow structural member and a method of manufacturing the same, and more particularly to a blocking member including a foamable material for blocking a cavity of a closed box-like hollow structural member constituted of a plurality of pieces of plates, such as pillars, rocker panels, roof side panels and hood panels of a vehicle body, so as to increase damping powers, sound Insulation powers and other powers of the hollow structural member when the foamable material is foamed by external heating. The invention is also concerned with a method of manufacturing such a blocking member.

2. Description of the Prior Art

FIG. 11 exemplarily shows a conventional blocking member 311. As will be appreciated, the blocking member 311 is constituted of only a foamable material 321. In this blocking member 311, to support the foamable material in a cavity 306 of a pillar 301 as a hollow structural member which is constituted of an inner pillar panel 302 and an outer pillar panel 304, a bolt 312 having a threaded section 312a is mounted on the inner pillar panel 302 so that the threaded section 312a projects into the cavity 306 for a desired length. The threaded section 312a is then provided with a washer 320. The foamable material 321 threadably engages the threaded section 312a so as to be seated on the washer 320. Thus, the foamable material 321 is supported in a cavity 306 of the pillar 301.

The blocking member as described above are disclosed, for example, in Japanese Laid-Open Patent Publication No. 2-276836 (corresponding to British Patent Application No. 8903211.4).

In the above-noted conventional blocking member 311, to support the foamable material 321 in the cavity 306 of the pillar 301, the inner panel 302 has to be previously formed with a mounting aperture 307 which may receive the bolt 312. Also, the foamable material 321 has to be formed with a threaded bore 325 which may threadably engage the threaded section 312a of the bolt 312. Thus, it takes a lot of labor to support the foamable material 321 in the cavity 306 of the pillar 301. This may lead to increased costs.

SUMMARY OF THE INVENTION

It is an object of the invention to provide a blocking member including a foamable material for blocking a cavity of a hollow structural member in which the problems associated with the conventional blocking member can be eliminated, and a method of manufacturing the same, that is, to provide a blocking member including a foamable material in which the foamable material can be easily and reliably supported in a desired position in the cavity without forming a mounting aperture in the hollow structural member, and a method of manufacturing the same.

In order to attain the object, the present invention provides a blocking member for blocking a cavity of a hollow structural member including a foamable material to be foamed and expanded by external heating, and a magnetic member provided on a surface of the foamable material for fixing the foamable material in the cavity by the magnetic force thereof.

With this blocking member, the foamable material is fixed in the cavity of the hollow structural member by the magnetic force of the magnetic member. As a result, the foamable material can be easily secured in a desired position in the cavity without forming a mounting aperture in the hollow structural member.

The present invention also provides a method of manufacturing a blocking member for blocking a cavity of a hollow structural member including the steps of providing a foamable material to be foamed and expanded by external heating, and providing a magnetic member on a surface of the foamable material.

This method permits easy formation of the blocking member of which the foamable material can be easily and reliably supported in a desired position in the cavity of the hollow structural member.

The present invention will become more fully apparent from the following description as it proceeds in connection with the drawings.

BRIEF DESCRIPTION OF THE DRAWINGS

FIG. 4 is a schematic illustration of the blocking member before magnet pellets are embedded in the foamable material;

FIG. 5 is a schematic illustration of the blocking member after the magnet pellets are embedded in the foamable material;

FIG. 6 is a schematic illustration of a blocking member according to a second embodiment of the present invention before magnet particulate is embedded in a foamable material;

FIG. 7 is a schematic illustration of the blocking member after the magnet particulate is embedded in the foamable material;

DETAILED DESCRIPTION OF THE PREFERRED EMBODIMENTS

Preferred embodiments of the invention will now be described in detail with reference to the drawings.

Figure 1:
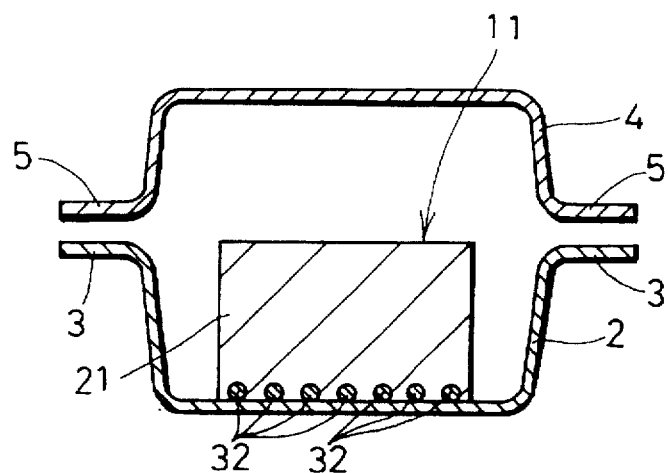
FIG. 1 is a sectional view of a blocking member according to a first embodiment of the present invention which is arranged on an inner panel of a pillar.
Figure 2:
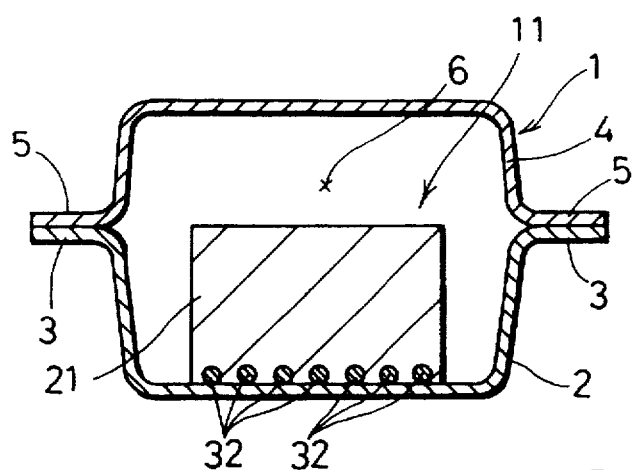
FIG. 2 is a sectional view of the blocking member arranged in a cavity of the pillar.
Figure 3:
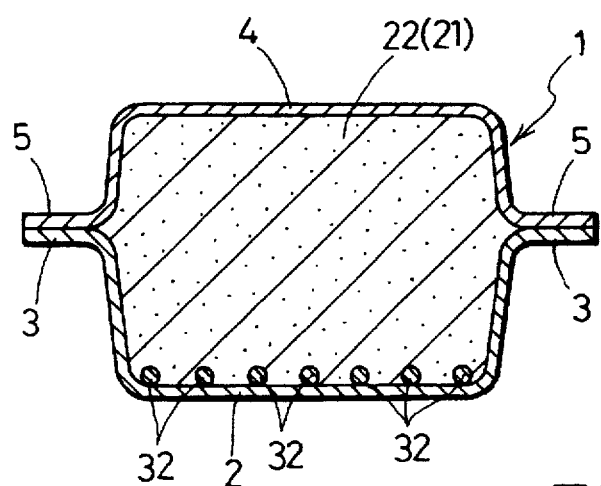
FIG. 3 is a sectional view of the blocking member arranged in the cavity after a foamable material is foamed and expanded.

Referring to FIGS. 1 to 5, shown therein is a first embodiment of the invention. As shown in FIGS. 1 to 3, a pillar 1 of a vehicle body is exemplified as a hollow structural member. As best shown in FIG. 2, the pillar 1 is constituted of an inner pillar panel 2 having a flange 3 and an outer pillar panel 4 having a flange 5. The inner and the outer pillar panels 2 and 4 are welded at the flanges 3 and 5 by spot welding to form the pillar 1 into a closed box-like hollow body including a cavity 6 therein. The cavity 6 of the pillar 1 receives a foamable material 21 which blocks the cavity 6 when it is foamed and expanded by external heating. The foamable material 21 is retained by a plurality of magnet pellets 32 as a magnetic member embedded in a lower surface 21a thereof.

The foamable material 21 is formed by injection molding and has a substantially rectangular parallelepipedic configuration. The foamable material 21 is made of a material, such as synthetic resin, synthetic rubber and other elastomer each containing a foaming agent, which can be foamed and cured by heat at the time the pillar 1 is heated to bake a coating material coated thereon, for example, at temperatures from 110° C. to 190° C. Such a material is disclosed, for example, in Japanese Laid-Open Patent Publication No. 2-276836.

As shown in FIGS. 4 and 5, the foamable material 21 is heated to a temperature of about 100° C. to sufficiently soften the lower surface 21a thereof. On the other hand, the magnet pellets 32 are previously arranged on a flat plate 40. The foamable material 21 as heated is forced to the flat plate 40 so that the softened lower surface 21a thereof contacts the flat plate 40. Thus, the magnet pellets 32 are embedded in the lower surface 21a of the foamable material 21, thereby forming a blocking member 11 which is constituted of the foamable material 21 and the magnet pellets 32.

Processes for incorporating the foamable material 21 to the pillar 1 and subsequent operations will now be described.

The blocking member 11 is previously positioned at a desired position on an inner surface of the Inner panel 2 in a manner that the lower surface 21a of the foamable material 21 faces the inner surface of the inner panel 2. Thus, as shown in FIG. 1, the foamable material 21 is properly positioned and fixed on the inner pillar panel 2 by magnetic force of the magnet pellets 32 embedded in the lower surface 21a of the foamable material 21.

Subsequently, as shown in FIG. 2, the inner and the outer pillar panels 2 and 4 are welded at the flanges 3 and 5 thereof by spot welding to form the pillar 1 having the closed box-like hollow shape and encapsulating the foamable material 21 therein.

Thereafter, the pillar 1 with the foamable material 21 is heated by external heating, for example, by external heating for baking the coating material coated on the automobile body. Consequently, as shown in FIG. 3, the foamable material 21 is foamed and expanded to produce a foamed product 22.

When the foamable material 21 is foamed and expanded to form the foamed product 22, as shown in FIG. 3, the foamed product 22 thus produced is adhered to an inner circumferential surface of the pillar 1. Thus, the cavity 6 is effectively blocked by the foamed product 22. As a result, the pillar 1 may have increased damping powers and sound insulation powers.

Referring now to FIGS. 6 and 7, shown therein is a second embodiment of the invention. This embodiment is a partial modification of the first embodiment. Therefore, only the construction which is different from that in the first embodiment will be explained.

In this embodiment, as shown in FIGS. 6 and 7, ferromagnetic particulate (iron particulate) 131 is used in place of the magnet pellets 32 of the first embodiment. The ferromagnetic particulate 131 is previously heated to a desired temperature and arranged on a flat plate 140. Thereafter, a foamable material 121 is forced to the flat plate 140 so that the lower surface 121a thereof sufficiently contacts the flat plate 140. Thus, the ferromagnetic particulate 131 is effectively embedded in the lower surface 121a of the foamable material 121. This is because the lower surface 121a is sufficiently softened by heat of the heated ferromagnetic particulate 131 when the lower surface 121a contacts the ferromagnetic particulate 131. Subsequently, the embedded ferromagnetic particulate 131 is magnetized to form magnet particulate 132 as a magnetic member, thereby forming a blocking member 111 which is constituted of the foamable material 121 and the magnet particulate 132.

Alternatively, like the first embodiment, to embed the ferromagnetic particulate 131 in the lower surface 121a of the foamable material 121, the foamable material 121 may be previously heated to a desired temperature instead of heating the ferromagnetic particulate 131 to be embedded.

Processes for incorporating the foamable material 121 to a pillar and subsequent operations are similar to those of the foamable material 21 of the first embodiment. Accordingly, their explanation will be omitted.

Figure 8:
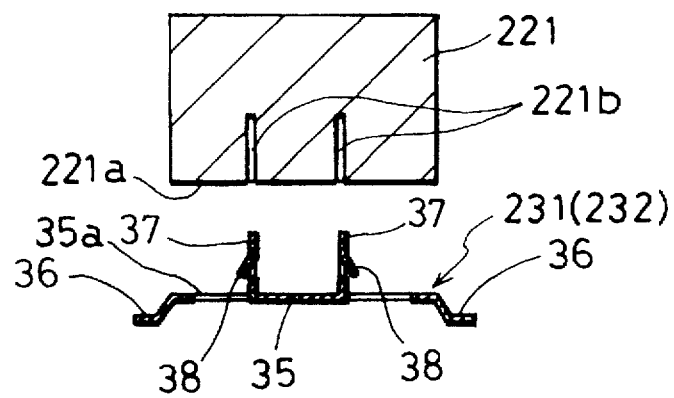
FIG. 8 is a schematic illustration of a blocking member according to a third embodiment of the present invention before a magnet plate is combined with a foamable material.
Figure 9:
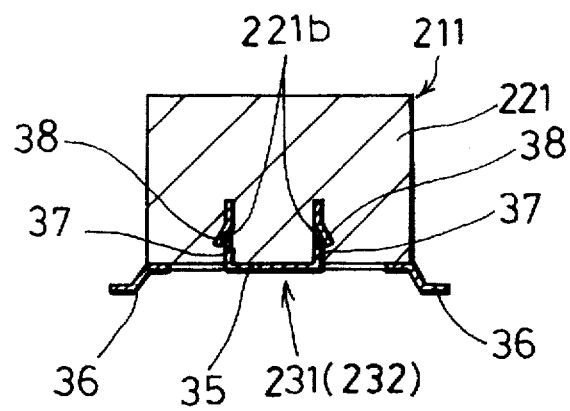
FIG. 9 is a schematic illustration of the blocking member after the magnet plate is combined with the foamable material.
Figure 10:
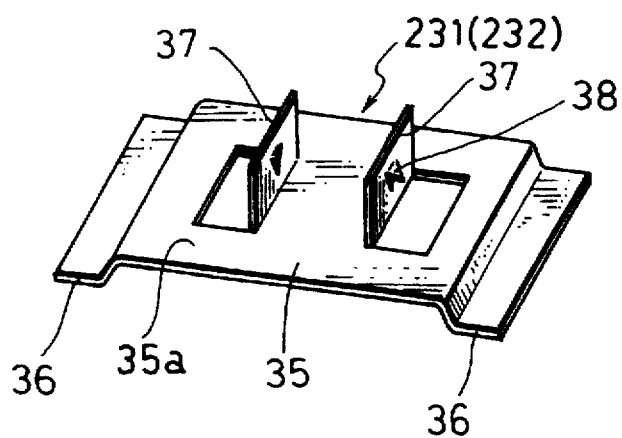
FIG. 10 is a perspective view of a ferromagnetic plate.
Figure 11:
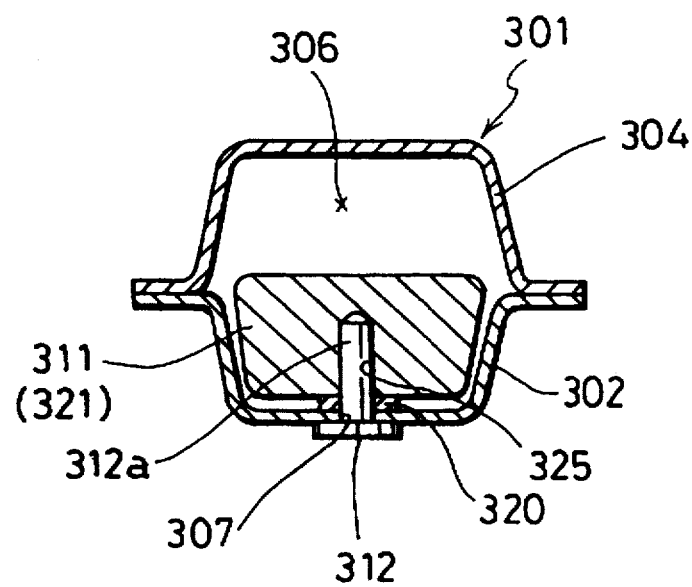
FIG. 11 is a sectional view showing a conventional blocking member.

Referring now to FIGS. 8 to 10, shown therein is a third embodiment of the invention. This embodiment is also a modification of the first embodiment. Therefore, a construction which is different from that in the first embodiment will be explained.

In this embodiment, as shown in FIGS. 8 to 10, a ferromagnetic plate (iron plate) 231 is used in place of the magnet pellets 32 of the first embodiment. As best shown in FIG. 10, the ferromagnetic plate 231 includes a flat portion 35 and a pair of leg portions 36 integrally formed on the flat portion 35. The flat portion 35 has a receiving surface 35a which may receive the lower surface 221a of a foamable material 221 thereon. Further, the flat portion 35 is provided with oppositely spaced engagement strips 37 each of which is integrally formed by stamping. Each engagement strip 37 additionally has an engagement projection 38 stamped thereon. The ferromagnetic plate 231 is magnetized to form a magnetic plate 232 as a magnetic member. As will be appreciated, the ferromagnetic plate 231 may be partially magnetized at the leg portions 36, if necessary.

As best shown in FIG. 8, a foamable material 221 is provided with a pair of slots 221b which are spaced apart to engage the engagement strips 37. The foamable material 221 is combined with the magnetic plate 232 by engaging the slots 221a with the engagement strips 37. Thus, the magnetic plate 232 is provided on the lower surface 221a of the foamable material 221, thereby forming a blocking member 211 which is constituted of the foamable material 221 and the magnet plate 232. As will be easily understood, the engagement projections 38 may effectively prevent the engagement strips 37 from slipping off from the slots 221b of the foamable material 221.

Processes for incorporating the foamable material 221 to a pillar and subsequent operations are similar to those of the foamable material 21 of the first embodiment. Accordingly, their explanation will be omitted.

As described above, according to the present invention, the foamable material can be easily secured in a desired position in the cavity without forming a mounting aperture in the hollow structural member. This may lead to reduced costs.

The preferred embodiments herein described are intended to be illustrative of the Invention and not to limit the invention to the precise form herein described. They are chosen and described to explain the principles of the invention and their application and practical use to enable others skilled in the art to practice the invention.

What is claimed is:

1. A blocking device for filling a cavity in a hollow structural member, comprising:

a blocking member consisting of a magnetic member and a foamable material;

said foamable material having a surface on which the magnetic member is embedded;

said blocking member having its magnetic member secured within the hollow structural member; and said foamable material being foamed and expanded to completely fill the cavity.

2. The blocking device as defined in claim 1, wherein said magnetic member comprises magnet pellets embedded in the surface of the foamable material.

3. The blocking device as defined in claim 1, wherein said magnetic member comprises ferromagnetic particles embedded in the surface of the foamable material.

4. The blocking device as defined in claim 1, wherein said magnetic member comprises a magnetized plate mounted on the surface of the foamable material.

5. A method of incorporating and expanding a blocking device to fill a cavity formed in a hollow structural member, the method comprising the steps of:

providing a magnetic material;

generating a foamable material;

positioning the foamable material on the magnetic material;

embedding the magnetic material onto a surface of the foamable material to generate a blocking device;

securing the blocking device within the cavity, and applying heat to foam and expand the foamable material so that the cavity is filled.

6. The method as defined in claim 5, wherein the step of embedding includes softening the surface of the foamable material, and embedding magnet pellets in the softened surface of the foamable material.

7. The method as defined in claim 5, wherein the magnetic material is ferromagnetic and the step of embedding includes heating the ferromagnetic material on the surface of the foamable material causing softening the surface by the heated ferromagnetic material, and magnetizing the ferromagnetic material.

8. The method as defined in claim 5, wherein the magnetic material is a formed ferromagnetic plate on the surface of the foamable material having engagement strips, the foamable material including slots, the steps of embedding consisting of engaging the strips in the slots and magnetizing the ferromagnetic plate.

* * * * *